No. 793,441. PATENTED JUNE 27, 1905.
R. HEALY.
TIRE.
APPLICATION FILED DEC. 28, 1904.
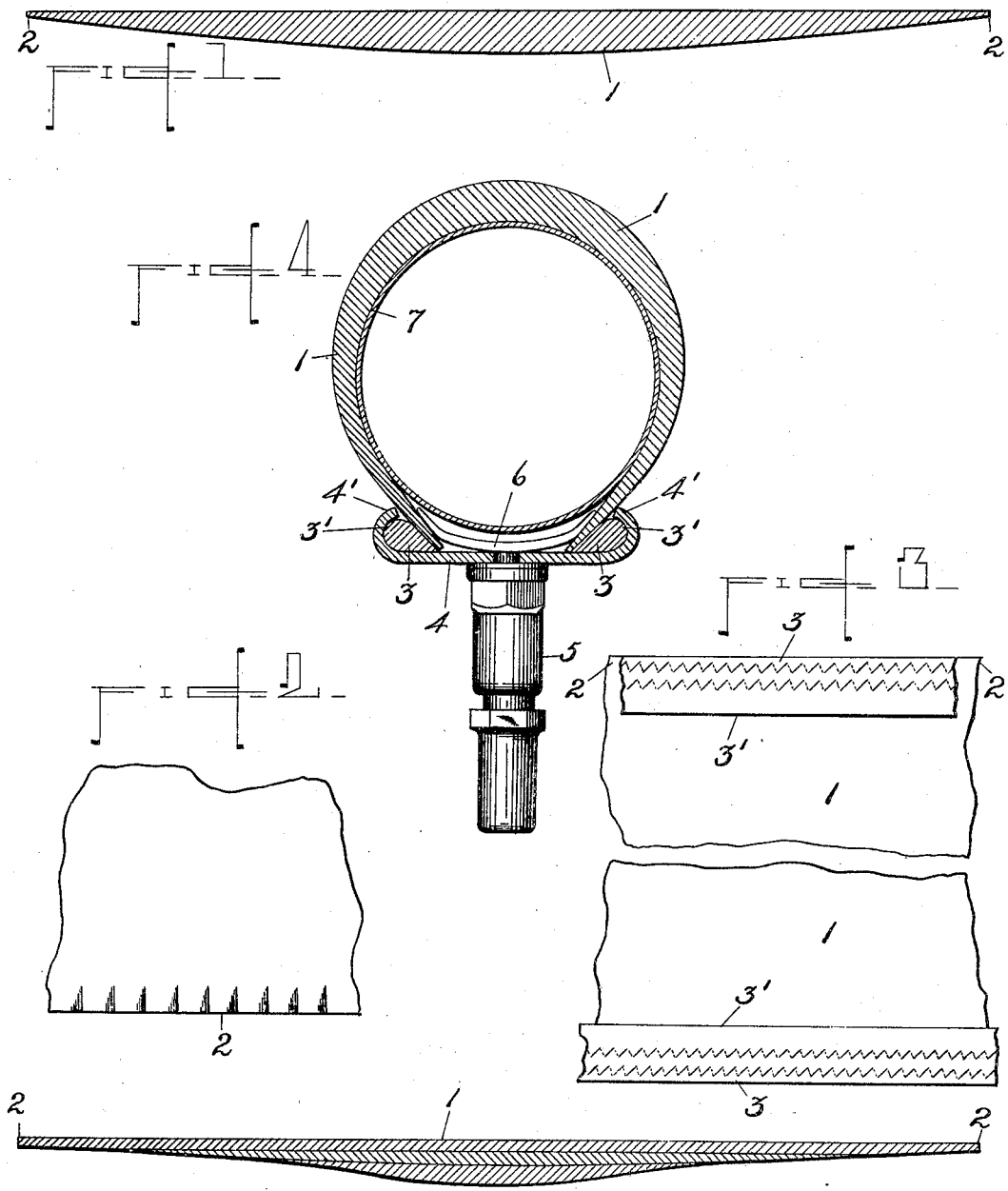
WITNESSES:
INVENTOR
Raymond Healy
BY
Townsend & Decker
ATTORNEYS No. 793,441. Patented June 27, 1905.

UNITED STATES PATENT OFFICE.

RAYMOND HEALY, OF BROOKLYN, NEW YORK.

TIRE.

SPECIFICATION forming part of Letters Patent No. 793,441, dated June 27, 1905.

Application filed December 28, 1904. Serial No. 238,567.

*To all whom it may concern:*

Be it known that I, RAYMOND HEALY, a citizen of the United States, and a resident of Brooklyn, in the county of Kings and State of New York, with post-office address 26 South Oxford street, have invented certain new and useful Improvements in Tires, of which the following is a specification.

My invention relates to the construction of tires made entirely of leather and suitable for use on automobiles and other vehicles.

The invention consists in the manner of forming the edges of the tire at the point where a fastening-strip is attached; and the special object is to give the tire the desired shape—that is to say, to cause the center portion thereof to bulge and have the usual and proper shape.

The entire tire is constructed of a single thickness of sole-leather, the edges of which are shaved or skived, leaving the part in the middle which forms the tread relatively heavy and tapering toward the edges, as the tire would be too rigid if it were made a uniform thickness to correspond with the desired thickness of the tread. After the strip has been properly skived the edges are crimped to make the leather of less length on the edges than in the middle or along the tread, and thus allow for the decreased diameter on the inner circumference of the tire after it has been formed. A narrow strip of leather is then secured in any suitable manner—as, for instance, by being riveted, sewed, cemented, or sewed and cemented—to the crimped edges, said strips serving to be gripped and held by the rim. The ordinary tube for inflation is used as in all other tires and is entirely surrounded and protected by the outer leather.

In the accompanying drawings, Figure 1 illustrates in cross-section a piece of leather of the form used in my invention. Fig. 2 is a plan of a portion of the same, the crimping of the edges being illustrated by shaded lines. Fig. 3 is a plan showing the retaining-strip sewed on the edges. Fig. 4 is a cross-section illustrating the manner of securing the tire to a wheel-rim. Fig. 5 illustrates a modification.

A piece of thick leather is shaved or skived toward the edges 2 to allow of a heavy and durable tread and yet have sufficient elasticity, so there will be no sudden jarring on the body of the vehicle when going over rough places.

To allow for the decreased circumference on the inner edge necessary to form the circle of the tire when passed around the wheel-rim, the edges 2 are crimped by lapping parts one over another, as shown in Fig. 2, and then flattening them in a press or by other means. A strip of leather 3 is then sewed or cemented or sewed and cemented or otherwise secured to the crimped edge 2.

The strip of leather here illustrated is shown as one solid piece gradually tapering to the edges; but the same might consist of a number of strips of leather fastened together by any suitable means—as, for instance, the tire might be formed by taking a strip of leather of the desired width of the tire and fastening to it by waterproof cement or other means a narrower strip to form a tread of the desired thickness, thus producing a leather tire thin at the edges to give the tire the desired elasticity, as shown in Fig. 5. In a similar manner a multiplicity of strips might be used. In this case the supplementary piece or pieces of leather would be on the inner side of the tire when formed.

In Fig. 4 is shown the manner of securing the tire to the wheel-rim, which is the same as that now employed for securing rubber tires to the rim. 4 is the common form of rim at present in use with rubber tires and having its edges terminating in flanges 4' to grip the tire. On bending the leather 1, having the strips 3 secured thereto, to form the tire the edges 3' of the said strips 3 straighten out away from the tire proper, and thereby form shoulders which fit in the flanges 4'. 5 is the ordinary clamping means used to secure the tire to the rim and has a spreader 6, which forces the shoulder 3' under the flanges 4' and holds the tire securely in place. 7 indicates the usual tube for inflation of the tire.

What I claim as my invention is—

A detachable leather tire having a tread and edges of one piece of leather, said edges being crimped and provided with clamping-strips, as and for the purpose described.

Signed at New York, in the county of New York and State of New York, this 24th day of December, A. D. 1904.

RAYMOND HEALY.

Witnesses:
C. T. TISCHNER, Jr.,
EDWARD COLE.